Patented Oct. 9, 1951

2,571,030

UNITED STATES PATENT OFFICE 2,571,030

ASTRINGENT, ANTIPERSPIRANT, AND METHOD OF MAKING

Thomas Govett, Summit, and Mildred L. Almquist, Maplewood, N. J., assignors to Reheis Company, Inc., a corporation of New York No Drawing. Application March 15, 1950, Serial No. 149,898

6 Claims. (Cl. 167—90)

This invention relates to an improved astringent and antiperspirant and the method of making it.

In the present day manufacture of astringents and antiperspirants, a widely used base material is aluminum basic chloride, sometimes referred to as chlorhydroxide complex of aluminum. This product is very satisfactory. There is some objection, however, because of the slow deterioration of fabrics into which the complex is absorbed during use, the objection being waived in commercial operations because the chlorhydroxide complex is superior in this regard to other materials offered for the same purpose. Aluminum chloride also is sometimes used as an astringent and antiperspirant. Aluminum chloride is very active in causing deterioration of fabric.

We have now discovered a double complex involving calcium, that is, calcium aluminum basic chloride which is an effective astringent and antiperspirant. We have discovered, in addition, that the deteriorating effect of the aluminum chloride compound is decreased by the inclusion of chlorides of other bivalent metals or of monovalent metals. These may be introduced either in the form of water soluble chlorides or of compounds that react to give such chlorides, when the compounds are mixed with aluminum chloride or chlorhydroxy complex.

Because the calcium aluminum basic chloride has particularly desirable properties for the present purpose, including the formation of gels with water, the invention will be first illustrated in connection with the use of this particular complex.

In a typical test, a drop of an aqueous aluminum chloride solution was applied to cotton fabric and the fabric then kept warm with a hot iron. The aluminum chloride decomposed the cotton to the extent of giving a spot which was almost black. The fabric in this spot cracked under pressure from the thumbnail. In a comparative test, using the commercial chlorhydroxy complex of aluminum which contains 6 atomic ratios of aluminum to 3 of chlorine, the spot of solution turned the cloth during the warming to a medium tan. In the same test, our calcium aluminum basic chloride, containing aluminum to chlorine in the 6:3 ratio and containing 1 calcium to 28 aluminum atoms, gave a spot which discolored only very little, in fact to about the extent of a water mark on a clean fabric.

Our complex should be expected to be hygroscopic because of its calcium chloride content. But films of our composition are not hygroscopic. As a matter of fact, our new composition, containing the calcium chloride as a component of the finished product, dries even more quickly when rubbed on the skin than does the conventional chlorhydroxy complex of aluminum containing no calcium chloride.

Briefly stated, our invention comprises a water dispersible complex of chlorides of aluminum and of a monovalent or dibasic metal. In the preferred embodiment, the invention comprises the calcium aluminum basic chloride of the kind described herein and cosmetic compositions containing it. The invention comprises finished antiperspirant creams including not only the said complex and water but also an oily or fatty component, a perfume, and an emulsification agent for dispersing, in the aqueous solution of the basic chloride, any water insoluble material present.

The calcium aluminum basic chloride, which is our preferred base material, is made by introducing a calcium compound and aluminum metal into an aqueous dispersion of aluminum chloride or the calcium compound alone into a chlorhydroxy complex of aluminum. Thus the calcium is introduced by mixing, with an aqueous solution of aluminum chloride or the chlorhydroxy complex of aluminum, a calcium compound that dissolves in the solution and preferably reacts with it. When aluminum metal is to be used, it is reacted with the aluminum chloride either before or after reaction of the latter with the calcium compound. A more detailed description of the method will be given later herein.

As the fatty component in the cream type of antiperspirant, we use one of the oily or fatty components that is usual in making the oil and water type emulsions of cosmetic creams. Examples of such component are the higher fatty acids such as stearic, palmitic and oleic acid; fatty acid esters and glycerides, as, for instance, glycerine mono-, di-, or tristearate, glycol distearate, and the corresponding palmitate and laurate esters.

With the solid fatty component of kind described, there is used preferably also an oil as, for instance, white mineral oil, castor oil, neatsfoot oil, olive oil, or the like. The mineral oil is preferred for this component.

A thickening agent is preferably incorporated into the cream, to increase the stiffness or viscosity of the mix. For this purpose a wax is satisfactory. Examples of waxes that may be used are spermaceti, beeswax, and ceresin. Other thickening agents that may be used are bentonite and pigments, the latter serving an additional function in establishing color.

The emulsifier if any, used to stabilize the dispersed insoluble materials in the aqueous solution of the calcium aluminum basic chloride, may consist in part of certain surface active or emulsifying agents included in the classes above, as, for example, glycerine monostearate. The emulsifiers must be surface active and nontoxic under the conditions of use. Examples are fatty alkylolamine condensates, quaternary ammonium compounds such as cetyl pyridinium chloride, salts of sulfated fatty esters or alcohols of which sodium lauryl sulfate and the sodium salt of sulfated octadecyl alcohol are examples, polyethylene glycol fatty acid salts, and alkylene oxide complexes of partial esters of glycerine with higher fatty acids, examples of which are sorbitan monostearate (Span 60) and polyethylene sorbitan monostearate (Tween 61).

Humectants also may be added to prevent excessive dryness of the film. Examples are glycerine, sorbitol, propylene glycol, and Arlex (a sorbitol solution in water).

Any usual perservative for such cosmetics may be added, a common class being esters of polyhydroxy benzoic acid such as the methyl, ethyl and butyl esters.

Conventional perfuming agents may be used to establish the desired odor and also pigments to whiten or otherwise color the cream. Titanium dioxide is a suitable pigment for this purpose.

Water is used in proportion to provide a cream of the desired consistency. Ordinarily the proportion of water will range from about 45% to 75% by weight of the whole composition.

The invention will be illustrated in greater detail by description in connection with the following examples to which reference is made.

EXAMPLE 1

In making the calcium aluminum basic chloride for use in our composition, we proceed to advantage as follows:

To 100 liters of aluminum chloride solution of density 24 Bé. there is added 120 liters of water. To the resulting diluted solution there is then added 3,000 g. of finely divided calcium carbonate with constant agitation and moderate heating, as to a temperature of about 80° C. In this reaction the calcium carbonate dissolves, by reacting to give calcium chloride and carbon dioxide. The latter escapes as a gas. The remaining product is an aluminum calcium chloride. To make the basic complex of desired composition there is added to the said solution 25,150 g. of aluminum powder. The reaction of the aluminum with the dissolved chloride salt is exothermic. The reaction unless moderated, proceeds violently. The added aluminum powder shares the chlorine with Al and Ca previously present and hydrogen escapes. The temperature and rate of reaction are controlled by adding the aluminum powder in increments and by the extent of heating or cooling as may be necessary.

The product so produced is filtered, to remove any undissolved impurity and to give a so-called "polished" solution.

The solution is dried, as under vacuum or is shipped directly in solution form for use in compounding.

The product made as described in this example has the atomic ratio of 6 aluminum to 3 chlorine. It contains 4 parts by weight of calcium to 100 parts by weight of aluminum, calculated as the free elements.

EXAMPLE 2

The procedure of Example 1 is modified by replacing the aluminum powder with granular aluminum (with an increase in the time of contact) until the aluminum dissolves.

EXAMPLE 3

To 20,000 g. of a solution of chlorhydroxy complex of aluminum, with the ratio of 5 atoms of aluminum to 3 atoms of chlorine and of concentration equivalent to 23.5% of aluminum calculated as $Al_2O_3$, we add calcium carbonate in the proportion of 370 g.

The calcium carbonate addition is added dry, with constant agitation. During the addition and agitation, the mixture is heated and is maintained at a temperature somewhat below the boiling point of water as, for instance at about 80° C. As the calcium carbonate is dissolved, additional water is added, to make up loss by evaporation. The basic chloride so made contains 5 aluminum atoms to 3 chlorine and contains 6% of calcium on the weight of aluminum. The solution is filtered. It is then either dried in vacuo or used in solution form as an antiperspirant.

EXAMPLE 4

As raw material, we use here 50,000 g. of a basic aluminum chloride complex solution with a 6:3 atomic ratio of Al:Cl and of strength equivalent to 9.4% of aluminum calculated as aluminum oxide. To this we add dry 679 g. of $CaCl_2.2H_2O$ with continued agitation until the added calcium chloride is dissolved. The product so made is then dried under vacuum. The product has an atomic ratio of 5 Al:3 Cl and it contains 7.4 parts by weight of calcium to every 100 parts by weight of aluminum.

EXAMPLE 5

The calcium aluminum basic chloride complex made as described in any of the preceding examples is then made into antiperspirant creams of the following formulas:

Formula I

| | | Grams |
|---|---|---|
| A. | Stearic acid | 12 |
| | Light mineral oil, 65/75 | 2 |
| | Beeswax, white | 2 |
| | G–2152 (polyoxyethylene glycol stearate) | 5 |
| | G–2160 (polyoxyethylene propylene glycol stearate) | 5 |
| | Titanium dioxide | 1 |
| B. | Water | 43 |
| C. | Aluminum calcium chlorhydroxide complex solution (5:3 ratio—23½% $Al_2O_3$) | 30 |

Melt "A" and bring to 80° C. Add "B" at 85° C. and cool with agitation to 30° C. Add "C" slowly with agitation.

Formula II

| | | Grams |
|---|---|---|
| A. | "Tegacid" Special (glycerol monostearate and sulfated fatty alcohol) | 15 |
| | Glycerine | 3 |
| | Spermaceti | 5 |
| | Water | 44.9 |
| B. | Aluminum calcium chlorhydroxide complex solution (5:3 ratio—23½% $Al_2O_3$) | 30 |

Heat "A" slowly over water bath to about 95° C. with constant agitation. Remove from water bath and continue agitation until temperature drops to about 40° C. Add "B" and continue agitation until completely dissolved.

*Formula III*

A. 
- "Tegacid" Special (glycerol monostearate and sulfated fatty alcohol) ---------- 15
- Span 60 (sorbitan monostearate) ------ 3
- Tween 61 (polyoxyethylene sorbitan monostearate) --------------------- 4
- Ceresin wax ---------------------------- 2

B.
- Propylene glycol, N. F. ------------------ 10
- Arlex (sorbitol solution), as humectant _ 2

C.
- Aluminum calcium chlorhydroxide complex solution (5:3 ratio—23½% $Al_2O_3$) _ 30
- Water ---------------------------------- 29

Melt "A" at 85° C., heat "C" to 85° C., and add to "A" slowly, with constant stirring. The mixture is stirred until it cools to 70° C., and "B" is added also at 70° C. It is then stirred until cool.

The 5:3 ratio in the above formulas refers to the number of aluminum atoms for 3 atoms of chlorine.

The Formulas I, II, and III above may be altered to make the solution type of product as distinguished from a cream. For this purpose there are omitted the fatty and oily components and also the thickening agent. The solution consists essentially of the aqueous calcium aluminum basic chloride solution, perfuming and emulsifying agents as desired, and preferably also an humectant to avoid excessively rapid drying of the composition when exposed over the surface in the package. For some purposes, the complex may be dissolved alone in aqueous alcohol (cologne). This is best accomplished by dissolving the complex first in water and then introducing the alcohol.

As to proportions I may use the basic chloride containing aluminum in the ratio of 4 to 7 atoms to 3 of chlorine. The proportion of calcium chloride contained in the finished product should be 0.2 to 15 parts by weight to 100 parts of aluminum, each being calculated as the element. Within this range the proportion of calcium selected should be higher the smaller the number of atoms of aluminum to 3 atoms of chlorine. This is illustrated in the following table:

| Atoms of Aluminum for 3 Atoms of Chlorine | Parts by Weight of Calcium for 100 Parts of Aluminum | |
|---|---|---|
| | Minimum | Preferred Range |
| 7 | 0.2 | 2–4 |
| 6 | 0.4 | 2–8 |
| 5.5 | 1.3 | 3–9 |
| 5 | 5.0 | 5–12 |
| 4 | 10.0 | 7–15 |

The minimum parts of calcium in the second column are the proportions required to show substantial decrease in deterioration of fabric which has been contacted with the astringent and anti-perspirant in a water solution of concentration equivalent to approximately 9.4 parts by weight of $Al_2O_3$ for 100 parts of the solution. When larger proportions of the calcium component are used than shown in the last column, there is at least as great protection against burning of the fabric. The larger proportions, however, are unnecessary unless for the purpose of forming gels of specific properties desired.

In place of the calcium in the astringent and antiperspirant compositions I may use any other monovalent or divalent metal provided its chloride is soluble in water and is non-toxic under the conditions of use of astringents and antiperspirants on the skin.

Examples of such other metals that may be substituted for the calcium are lithium, sodium, potassium, zinc and magnesium. They may be used alone or mixed with each other or with calcium.

In making compositions containing these alternatives for the calcium, the procedure of any one of the numbered examples above is followed in detail except for the direct substitution of an equal weight of the compound of the alternative metal for the corresponding compound of calcium as used in the several examples. Thus any one of the metals in the form of a carbonate may be substituted for the calcium carbonate. Likewise the chloride of any of these alternative mono- and divalent metals may be substituted for calcium chloride in making the finished complex.

When these alternative materials are used in place of calcium, certain problems arise. Thus there is not formed in all cases a gelatinous complex. In some instances the crystalline nature of the alternative metal compound reappears on drying the complex. As to burning characteristics on the other hand, all of these alternative metals reduce the scorching or objectionable deterioration of the fabric treated with the astringent and antiperspirant.

In using calcium or any of these alternative metals, we obtain a result superior to that obtained with the chlorhydroxy complex of aluminum. We may also omit the use of this complex as a raw material in making our new product. Thus we may use the divalent or monovalent metal in the form of a solution of its chloride in water containing hydrochloric acid. To this solution aluminum powder is added and contact maintained until the aluminum dissolves. The proportions of the reacting materials are selected initially to give the ratios stated above as required in the finished product. In this procedure the aluminum goes directly to the calcium complex.

The products here described are excellent astringents and antiperspirants.

It will be understood also that it is intended to cover all changes and modifications of the examples of the invention herein chosen for the purpose of illustration which do not constitute departures from the spirit and scope of the invention.

What we claim is:

1. A composition of matter comprising a chlorhydroxy complex of aluminum and a non-toxic metal that has a valence not greater than 2 and that is soluble and non-toxic when in the form of its chloride, in the proportion of 4–7 atomic ratios of aluminum to 3 of chlorine and 0.2 part to 15 parts by weight of the said metal for 100 parts of aluminum, the composition being dispersible in a limited proportion of water to form a gel and soluble on greater dilution with water to form a solution.

2. The composition of claim 1 in which the metal is selected from the group consisting of calcium, magnesium, zinc, lithium, sodium, and potassium.

3. A composition of matter comprising calcium aluminum basic chloride containing aluminum, calcium and chlorine in the proportion of 4-7 atomic ratios of aluminum to 3 of chlorine and 0.2 part to 15 parts by weight of calcium for 100 parts of aluminum, the composition being dispersible in a limited proportion of water to form a gel and soluble on greater dilution with water to form a solution.

4. The method of making calcium aluminum basic chloride which comprises dissolving a chlorhydroxy complex of aluminum in water, adding to the resulting solution a calcium compound that is soluble in the said solution, and maintaining contact of the said solution and calcium compound until the calcium compound completely dissolves, the proportion of the ingredients being adjusted to give an overall ratio of 4-7 atoms of aluminum to 3 of chlorine and 0.2 part to 15 parts by weight of calcium to 100 parts of aluminum.

5. An astringent and antiperspirant composition comprising calcium aluminum basic chloride containing 3 chlorine atoms for 4-7 aluminum atoms and containing at least 0.2 part of calcium for 100 parts of aluminum in the composition.

6. An astringent and antiperspirant comprising the basic chloride of aluminum and a second non-toxic metal that has a valence not greater than 2 and that is soluble and non-toxic when in the form of its chloride, the said basic chloride containing chlorine in the proportion of 3 atoms for 4-7 aluminum atoms.

THOMAS GOVETT.
MILDRED L. ALMQUIST.

REFERENCES CITED

The following references are of record in the file of this patent:

UNITED STATES PATENTS

| Number | Name | Date |
|---|---|---|
| 2,196,016 | Huehn | Apr. 2, 1940 |
| 2,492,085 | Andersen | Dec. 20, 1949 |

OTHER REFERENCES

De Navarre, Chem. & Mfg. of Cosmetics (1941), p. 323.

Harry, Modern Cosmeticology (1940), p. 126.

Hilfer, Drug and Cosmetic Ind., Nov. 1948, vol. 63, pp. 604, 605, 683.